Figure 1:
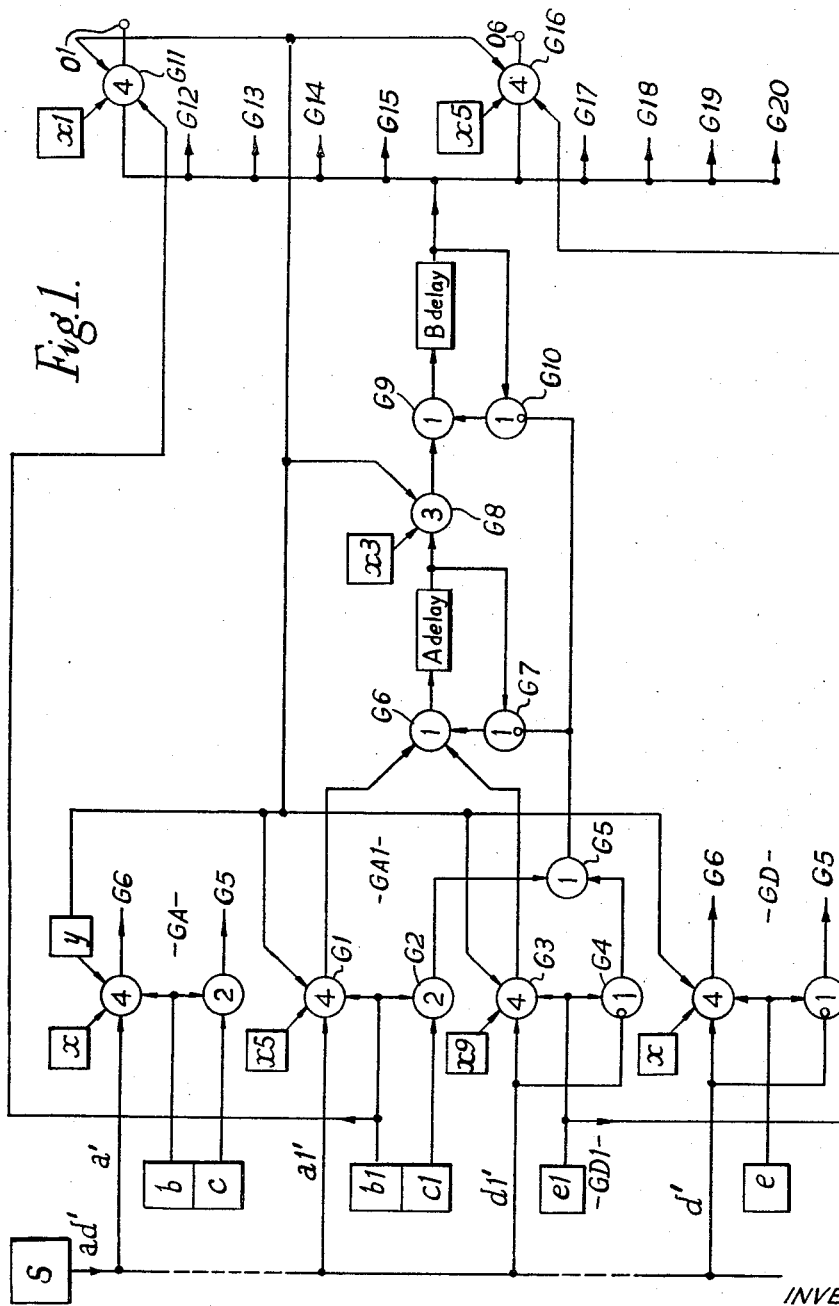

Oct. 18, 1960  W. S. DOUGLAS  2,957,075
PULSE CHECKING CIRCUITS
Filed March 2, 1959  2 Sheets-Sheet 2

INVENTOR
WILLIAM SHOLTO DOUGLAS
BY
Craig and Freudenberg
ATTORNEYS

United States Patent Office 2,957,075
Patented Oct. 18, 1960

1

2,957,075

PULSE CHECKING CIRCUITS

William Sholto Douglas, Norwood Green, Southall, England, assignor to Ericsson Telephones Limited, London, England, a British company Filed Mar. 2, 1959, Ser. No. 796,443

Claims priority, application Great Britain Mar. 3, 1958

7 Claims. (Cl. 328—120)

The present invention relates to pulse circuits for checking repeatedly the persistence of each of a plurality of signals, each signal being of the type comprising a train of regularly recurring pulses, the pulses of the plurality of signals being interlaced with one another to form recurring groups, each group occurring in the repetition period of the pulses in one of the signals.

It is an object of the present invention to provide a pulse checking circuit common to all the said signals which will repeatedly check the persistence of each signal.

According to the present invention there is provided an electrical pulse-checking circuit for checking the persistence of a plurality $n$ of signals of the type defined, comprising $n$ input gating circuits for the $n$ signals respectively, each input gating circuit having one input terminal connected to a common input terminal for connection to a source of the signals, the input gating circuits having output terminals connected to a delay circuit having at least one closed loop round which pulses may circulate, switch means adapted to interrupt the circulation of pulses in the loop and an output circuit connected to $n$ output gating circuits of the checking circuit corresponding to the $n$ input gating circuits respectively, the checking circuit further comprising means adapted to open the input gating circuits in a predetermined sequence such as to allow selected pulses of the $n$ signals to enter the delay circuit, $n$ inhibiting circuits associated with the input gating circuits respectively and adapted to operate the switch means on the absence of any signal to interrupt the circulation in the delay circuit of any pulse originally derived from the absent signal, and means adapted to open the output gating circuits in succession at predetermined intervals of time after the input gating circuits respectively have been opened whereby a pulse introduced into the delay circuit through an input gating circuit and still circulating in the delay circuit passes from the output circuit of the delay circuit, through the corresponding output gating circuit to provide an output signal indicative of the persistence of the corresponding signal.

The delay circuit may comprise a plurality of circulating loops connected together in cascade through one or more intermediate gating devices, the output terminals of the input gating devices being connected to an input circuit of the first circulating loop and the output circuit of the delay circuit to an output circuit of the last circulating loop, means being provided for opening the intermediate gating device or devices from time to time in such a manner as to allow pulses to pass from one circulating loop to the next.

Figure 2:
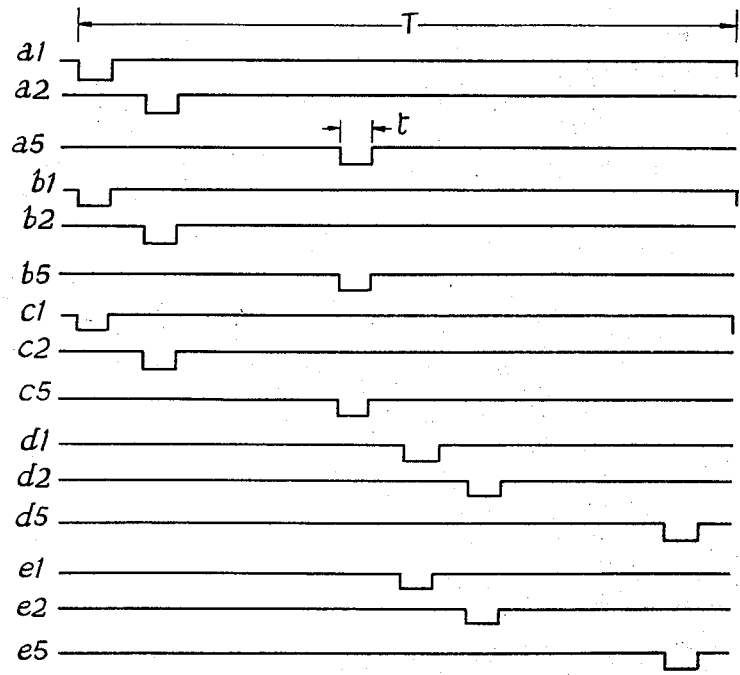
Figure 3:
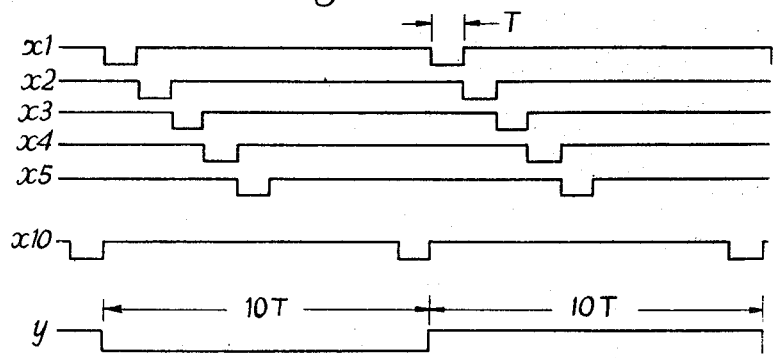

The invention will now be described by way of example with reference to the accompanying drawings, in which:

Fig. 1 shows in schematic form a simple embodiment of the invention and combining two methods of checking the persistence of a plurality of signals, and Figs. 2 and 3 show graphically the time in relationships between the various controlling and controlled pulses in the circuit shown in Fig. 1.

2

In Fig. 1 there is shown a common input wire $ad$ for connection to a source S of ten signals of the type defined. Each signal consists of negative going pulses of duration $t$ occurring at a recurrence frequency of T. The ten signals have been labelled $a1$, $a2$, $a3$, $a4$, $a5$, $d1$, $d2$, $d3$, $d4$ and $d5$ and pulses of the ten signals respectively follow in the order of the above sequence. Thus in Fig. 2 a period T is shown with one pulse of each of the signals $a1$, $a2$, $a5$, $d1$, $d2$ and $d5$. For convenience those intervals of time of duration $t$ in which pulses of the signal $a1$ occur when the signal $a1$ is present will be called $a1$ intervals, and similarly for the other signals. The input wire $ad'$ is connected to ten input gating circuits of which one, GA1, corresponds to the signal $a1$ and another, GD1, corresponds to the signal $d1$. Four more gating circuits identical with the circuit GA1 correspond to the signals $a2$ to $a5$ and four more gating circuits identical with the circuit GD1 correspond to the signals $d2$ to $d5$. Only two further circuits GA and GD of the two types respectively have been shown. All ten circuits have two output leads connected to two gates G5 and G6 respectively. Further description will be confined to the circuits GA1 and GD1.

Considering the gating circuit GA1, an input lead $a1'$ is connected from the lead $ad'$ to one input of a 4-gate G1.

An $m$-gate is a gating circuit having at least $m$ inputs and an output, the circuit being such that a given voltage appears at the output on the simultaneous application of given voltages to at least $m$ of the inputs, or the $m$ inputs if there be only $m$.

Pulses of the signal $a1$ are identified by negative-going pulses from a source $b1$ connected to the 4-gate G1 and to a 2-gate G2. Pulses from the source $b1$ occur in the $a1$ intervals, but are arranged to occur in every $a1$ interval, whereas the signal $a1$ may be present or absent at any given time. A source of negative-going pulses $c1$ is connected to the two-gate G2, and pulses from the source $c1$ occur in the $a1$ intervals. It is arranged that pulses from the source $c1$ are present only when pulses of the signal $a1$ are not present.

Sources of pulses $b2$ to $b5$ and $c2$ to $c5$ represented by sources $b$ and $c$ and corresponding to the signals $a2$ to $a5$ on leads represented by lead $a'$ are also provided for the other gating circuits GA and in Fig. 2 pulses from the sources $b1$, $b2$, $b5$, $c1$, $c2$ and $c5$ are shown.

Two further inputs are connected to the four-gate G1 from sources of pulses $x5$ and $y$ respectively. The source $x5$ is one of ten sources $x1$ to $x10$ which generate negative-going pulses of duration T, a pulse from the source $x1$ being immediately followed by a pulse from the source $x2$ and so on, the sequence of ten pulses repeating immediately, after a pulse from the source $x10$. The source $y$ generates negative-going pulses of duration 10T with a periodicity of 20T. Each pulse from the source $y$ starts simultaneously with a pulse from the source $x1$. Pulses from the sources $x1$ to $x5$, $x10$ and $y$ are shown in Fig. 3.

The gate G1 provides an output pulse whenever pulses from the sources $b1$, $x5$ and $y$ and a pulse of the signal $a1$ occur simultaneously. The output of the gate G1 is connected to a 1-gate G6. It will be seen that the recurrence frequencies are such that an opportunity is given for a pulse in an $a1$ interval to be applied to the gate G6 every 20th $a1$ interval, although such a pulse is only applied when the signal $a1$ is present.

The gate G2 has its output connected to a 1-gate G5 and applies an output pulse to the gate G5 whenever pulses from the sources $b1$ and $c1$ occur simultaneously. Thus in every $a1$ interval when the signal $a1$ is absent a pulse is applied to the 1-gate G5.

The gating circuit GD1 is similar to the circuit GA1 but in effect contains within itself the means for deriving pulses in $d1$ intervals when the signal $d1$ is absent. The lead $ad'$, the sources $x9$ and $y$ and a source $e1$ of pulses occurring in every $d1$ interval are connected to a 4-gate G3. The lead $ad'$ is connected as an inhibiting input to a gate G4. The source $e1$ is connected through the gate G4 to the 1-gate G5. When the signal $d1$ is present pulses from the source $e1$ prevented from passing through the gate G4, but when the signal $d1$ is absent pulses from the source $e1$ pass through the gate G4 to the 1-gate G5.

The output of the gate G6 is connected to a delay device A, and the output of the delay device A is connected to its own input by way of a gate G7 and the gate G6. The gate G7 has an inhibiting input connected to the output of the gate G5, and providing a signal is not present at this input, an input signal applied to the delay device A will continue to circulate from the output to the input by way of the gates G6 and G7. The output of the delay device A is also connected to a similar delay device B through a 3-gate G8 and a 1-gate G9, the output of delay device B being connected to its own input way of a gate G10 and the gate G9. The gate G10 has an inhibiting input connected to the output of the gate G5 and providing that a signal is not present at this input, an input signal applied to the delay device B will circulate from the output to the input by way of the gates G10 and G9. The 3-gate G8 has two further inputs connected to the sources $x3$ and $y$.

The output of the delay device B is connected to one input of each of ten 4-gates G11 to G20 corresponding to the gating circuits GA1 to GA5, GD1 to GD5 respectively. Only the gates G11 and G16 corresponding to the gating circuits GA1 and GD1 are shown. The 4-gate G11 has three further inputs connected to the source $b1$, $x1$ and $y$ and an output connected to a terminal O1. The 4-gate G16 has three further inputs connected to the sources $e1$, $x5$ and $y$ and an output connected to a terminal O6.

In checking the persistence of pulses of the signal $a1$ the circuit operates as follows. When pulses from the signal $a1$ and the source $b1$ are coincident with a pulse from each of the sources $x5$ and $y$, the gate G1 produces an output signal which is applied to the delay device A by way of the gate G6. The delay period of the delay device A is equal to T, and the output signal from the delay device A is fed back to its input by way of the gate G7 and the gate G6, and will continue to be fed back at repeated intervals of T providing an inhibitory signal is not applied to the gate G7. should a pulse of the signal $a1$ fail to appear, a pulse from the source $c1$ appears and produces an output signal at the gate G2 which is applied to the gate G5. The output signal thus produced from the gate G5 forms the inhibiting input to the gate G7 and is coincident with the input to gate G7 obtained from the output of delay device A. Thus the pulse circulating in delay device A and present at its output in the $a1$ interval ceases and is not re-established until a further concidence of pulses from the signal $a1$ and the sources $b1$, $x5$ and $y$ occurs. Should pulses of the signal $a1$ persist the delay device A continues to produce output pulses at intervals of T where are applied to the gate G8, and on the coincidence of one of these signals with pulses from the sources $x3$, and $y$, an output signal is applied to the delay device B by way of the gate G9. Thus when pulses of the signal $a1$ persist, the output signal of the delay device A is sampled at $20T-T(5-3)$ after the first appearance of a pulse of the signal $a1$ and an input signal is applied to the delay device B.

The delay period of the delay device B is also T and a pulse is passed from the output to the input thereof by way of the gates G10 and G9 after each period T has elapsed. Should a pulse of the signal $a1$ fail to appear, a pulse from the source $c1$ appears, an inhibitory signal is applied to the gate G10 coincident with the pulse from the input of delay device B and the pulse in the $a1$ interval ceases to circulate in the delay device B. Should pulses of the signal $a1$ persist the delay device B continues to produce output pulses at regular intervals of T which pulses are applied to the gate G11, and on the coincidence of one of these signals with pulses from the sources $x1$, $b1$ and $y$ an output signal is applied to the output terminal O1. Thus the output of delay device B is sampled at $2 \times 20T - T(5-1)$ after the first appearance of a pulse of the signal $a1$ and an output signal is produced at the terminal O1. Thus, wherever the signal $a1$ persists for 36 pulses or more from a pulse occurring during the coincidence of pulses from the source $x5$ and $y$ an output is provided at terminal O1.

In checking the persistence of pulses of the signal $d1$ the arrangement operates in the following manner. When pulses of the signal $d1$ on lead $d1'$ and a pulse from the source $e1$ are coincident with pulses from the source $x9$ and $y$ the gate G3 produces an output signal which is applied to the delay device A through the gate G6. The gate G4 is inhibited during each $d1$ interval in which the signal $d1$ is present. The output signal of the delay device A is fed back to the input at intervals of T as previously described. Should a pulse of the signal $d1$ fail to appear, the gate G4 is no longer inhibited and a pulse from the source $e1$ produces an output signal at the gate G4 which is passed by the gate G5 to the gate G7 to which it forms an inhibiting input signal. This inhibiting signal is coincident with the input signal in the $d1$ interval obtained from the output of the delay device A. Thus the pulse caused to circulate in delay device A by the application of a pulse of the signal $d1$ ceases, and cannot be re-established until the next coincidence of pulses of the signal $d1$ and sources $e1$, $x9$ and $y$. Any other pulses which may be circulating in other intervals $a1$ to $a5$ or $d2$ to $d5$ are unaffected. Should pulses of the signal $d1$ persist the delay device A continues to produce input pulses at intervals of T which pulses are applied to the gate G8, and on the coincidence of one of these pulses with pulses from the sources $x3$ and $y$ an input signal is applied to the delay device B by way of the gate G9. Thus when pulses of the signal $d1$ persist, the output signal of delay device B in the $d1$ position is sampled at a period $20T-T(9-3)$ after the first appearance of a pulse in the $d1$ position, and an input signal is applied to the delay device B. Should pulses of the signal $d1$ then cease, an inhibiting input is applied to the gate G10 which causes the pulse in the $d1$ position which is circulating through the delay device B to cease. If pulses of the signal $d1$ persist the delay device B continues to produce output signals at intervals of T which are applied to the gates G12, and on the coincidence of one of these signals with pulses from sources $x5$, $e1$ and $y$ an output signal is produced at the output terminal O6. Thus the output of delay device B which is due to the persistence of pulses of the signal $d1$ is sampled at $2 \times 20T - T(9-5)$ after first appearance of a pulse of the signal $d1$ and an output signal is produced at the output terminal O6. Thus wherever the signal $d1$ persists for 36 or more pulses from a pulse occurring during the coincidence of pulses from the sources $x9$ and $y$ an output is provided at the terminal O6.

It will be appreciated that the arrangement described allows considerable latitude in the range over which the persistence of the pulses is checked and that the persistence of the pulses of different signals may be tested over different ranges, by connecting appropriate sources $x1$ to $x10$ to the input and output gating circuits.

Suitable sources for the various pulses required to control the checking circuit are well known in the art and for instance comprise frequency dividing circuits whereby pulses of duration T and 10T are derived from those occurring at intervals of $T/10$.

Although in the simple arrangement described ten signals can be repeatedly checked for persistence, the arrangement may be used for checking the persistence of much larger pluralities of signals by the use of suitable timing arrangements. For example, if T is made equal to one milli-second and $t$ is made equal to 1 micro-second 900 signals can conveniently be checked for persistence by the arrangement.

I claim:

1. An electrical pulse-checking circuit for checking the persistence of a plurality $n$ of signals of the type comprising a train of regularly recurring pulses, the pulses of the plurality of signals being interlaced with one another to form recurring groups, each group occurring in the repetition period of the pulses in one of the signals, comprising a common input terminal for connection to a source of said signals, $n$ input gating circuits for the said $n$ signals respectively, each input gating circuit having a first input terminal connected to said common input terminal and an output terminal, said circuit further comprising a delay circuit having an input circuit, an output circuit, at least one closed loop round which pulses may circulate and switch means for interrupting the circulation of pulses in the loop, said input circuit being connected to the output circuits of said input gating circuits, said pulse-checking cir circuit further comprising $n$ inhibiting circuits associated with said input gating circuits respectively and $n$ output gating circuits corresponding to said input gating circuits respectively, said inhibiting circuits being coupled to said switch means and responsive to the absence of any one of said signals to operate said switch means to interrupt the circulation in said delay circuit of any pulse originally derived from the absent signal, said output gating circuits being connected to said output circuit of said delay circuit and said pulse checking circuit comprising pulse source means coupled to said input and output gating circuits for opening said gating circuits in a predetermined sequence to allow selected pulses of said $n$ signals to enter said delay circuit and to open said output gating circuits in succession at predetermined intervals of time after said input gating circuits respectively have been opened whereby a pulse introduced into said delay circuit through an input gating circuit and still circulating in said delay circuit passes from said output circuit of said delay circuit through the corresponding output gating circuit to provide an output signal indicative of the persistence of the corresponding signal.

2. An electrical pulse-checking circuit according to claim 1, wherein said delay circuit comprises a plurality of circulating loops, means including at least one intermediate gating device connecting said loops together in cascade and means connecting said intermediate gating device to said pulse source means, whereby said intermediate gating device is opened from time to time to allow pulses to pass from one circulating loop to the next.

3. An electrical pulse checking circuit according to claim 2, wherein there are two circulating loops, each consisting of a delay line having an input and an output, means including an inhibiting gate connecting said output to said input, the two inhibiting gates constituting said switch means and having their inhibiting inputs connected together to the outputs of said $n$ inhibiting circuits.

4. An electrical pulse-checking circuit according to claim 1, wherein each said input gating circuit consists of an $m$ gate having a first input terminal, a second input terminal and at least one other input terminal, said first input terminal being connected to said common input terminal, said pulse source means including a source of identifying pulses occurring in every interval during which a pulse of the signal pertaining to said gate can occur, means applying said identifying pulses to said second input terminal, a source of gating pulses having a repetition period greater than that of said identifying pulses and means applying said gating pulses to said other input terminal.

5. An electrical pulse-checking circuit according to claim 4, wherein each said inhibiting circuit comprises a 2-gate, having a first and a second input terminal, an output terminal and means connecting said output terminal to said switch means, said first input terminal being connected to said source of identifying pulses pertaining to the associated input gating circuit, said pulse source means further comprising a source of pulses occurring in every interval during which a pulse of the signal pertaining to the associated gate can occur but does not occur and means connecting the last said source to said second input terminal.

6. An electrical pulse-checking circuit according to claim 4, wherein each said inhibiting circuit comprises an inhibiting gate having a first input terminal, an inhibiting input terminal, an output terminal and means connecting said output terminal to said switch means, said first input terminal being connected to said source of identifying pulses pertaining to the associated input gating circuit and said inhibiting input terminal being connected to said common input terminal.

7. An electrical pulse-checking circuit according to claim 4, wherein each said output gating circuit consists of an $m$ gate having a first input terminal, a second input terminal and at least one other input terminal, said first input terminal being connected to said output circuit of said delay circuit, said second input terminal being connected to said source of identifying pulses pertaining to the corresponding input gating circuit and said other input terminal being connected to a source of pulses having a repetition period greater than that of the pulses in said signals.

No references cited.